United States Patent [19]
Shimizu et al.

[11] Patent Number: 5,639,116
[45] Date of Patent: Jun. 17, 1997

[54] INSTRUMENT PANEL STRUCTURE IN VEHICLE

[75] Inventors: Toshimitsu Shimizu; Kazuo Masaki; Toru Kobayashi; Yukio Akimoto, all of Wako, Japan

[73] Assignee: Honda Giken Kogyo Kabushiki Kaisha, Tokyo, Japan

[21] Appl. No.: 428,955

[22] Filed: Apr. 26, 1995

[30] Foreign Application Priority Data

Apr. 28, 1994 [JP] Japan ................................ 6-092426

[51] Int. Cl.$^6$ ............................................ B60R 21/16
[52] U.S. Cl. ................ 280/732; 180/90; 280/728.1; 280/728.3; 224/282; 224/483; 224/541; 296/37.1
[58] Field of Search ........................ 280/728.3, 728.1, 280/732; 180/90; 296/70, 73, 37.1; 224/541, 282, 483

[56] References Cited

U.S. PATENT DOCUMENTS

| | | | |
|---|---|---|---|
| 4,893,833 | 1/1990 | DiSalvo et al. | 280/732 |
| 5,316,335 | 5/1994 | Gray et al. | 280/732 |
| 5,333,901 | 8/1994 | Barnes | 280/732 |
| 5,342,088 | 8/1994 | Bauer | 280/732 |
| 5,348,343 | 9/1994 | Hawthorn | 280/732 |
| 5,458,365 | 10/1995 | Rogers et al. | 280/732 |

FOREIGN PATENT DOCUMENTS

| | | | |
|---|---|---|---|
| 4217173 | 11/1993 | Germany | 280/728.3 |
| 59-8550 | 1/1984 | Japan | 224/483 |
| 60-76440 | 4/1985 | Japan | 224/483 |
| 5-270342 | 10/1993 | Japan | 280/732 |

*Primary Examiner*—Eric D. Culbreth
*Attorney, Agent, or Firm*—Armstrong, Westerman, Hattori, McLeland & Naughton

[57] ABSTRACT

An opening is defined in an upper portion of a side surface of an instrument panel, such that it is opposed to an air bag module mounted in front of a passenger's seat within the instrument panel. A tray is removably locked in the opening by a locking device. If the tray is removed from the opening, the air bag module is exposed and thus, it is possible for an operator to easily carry out the maintenance operation and the removal of the air bag module in a comfortable position without bending his body.

2 Claims, 8 Drawing Sheets

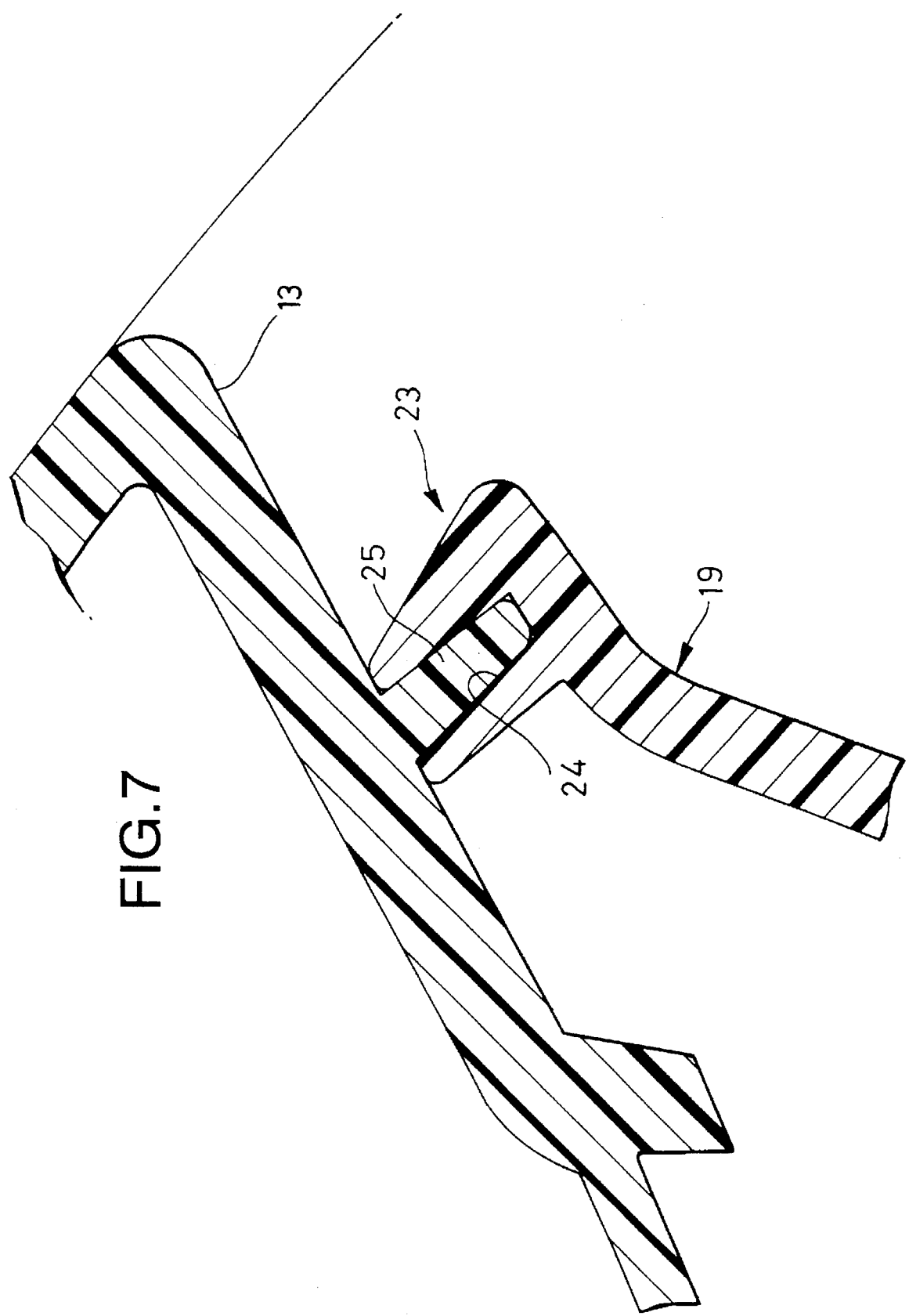

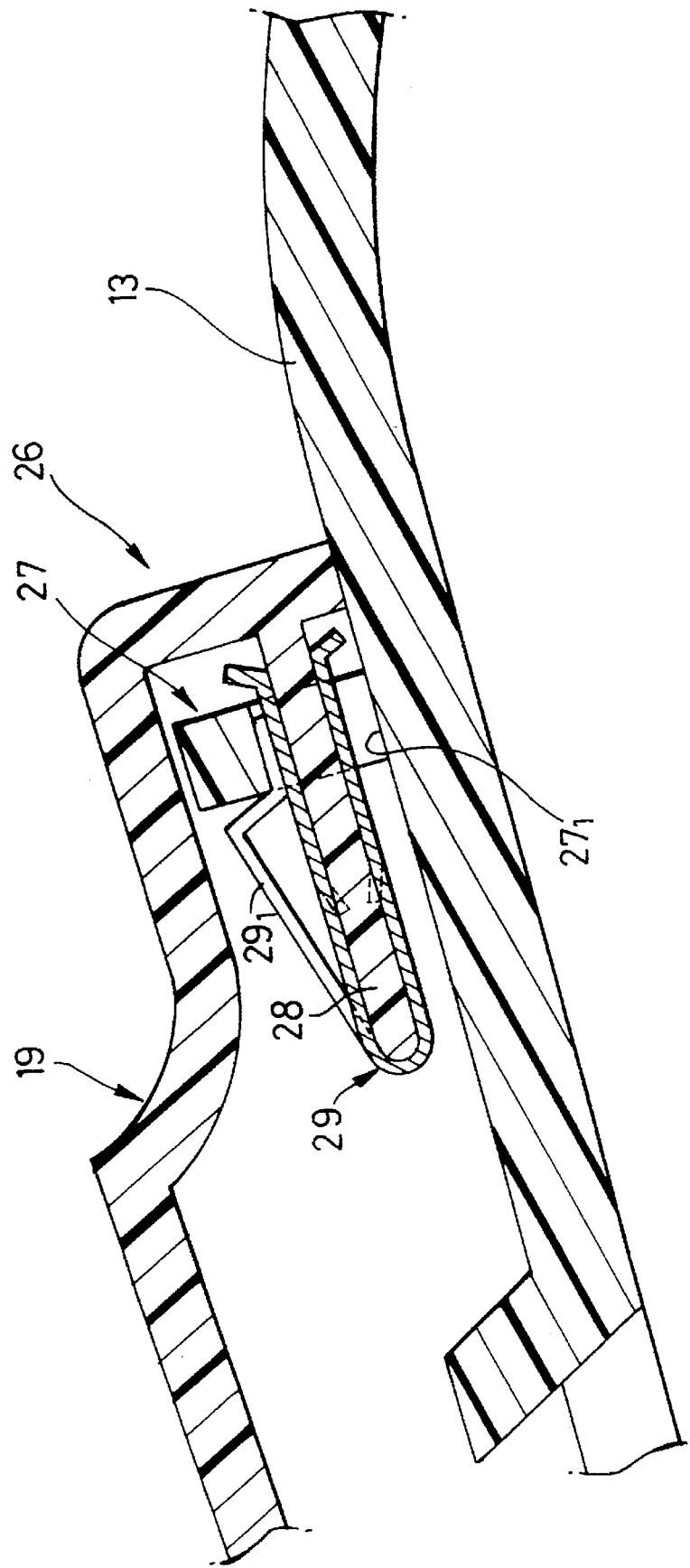

INSTRUMENT PANEL STRUCTURE IN VEHICLE

BACKGROUND OF THE INVENTION

1. Field of the Invention

The present invention relates to an instrument panel structure in a vehicle which accommodates an air bag module for a passenger seat.

2. Description of the Prior Art

An air bag module is operable for inflating and developing an inflated air bag in a passenger compartment upon collision of the vehicle so as to hold and protect an occupant. In general, an air bag module for a driver's seat is mounted at a central portion of a steering wheel, and an air bag module for a passenger's seat is mounted within an instrument panel. When the air bag module for the passenger's seat is operated, the air bag is inflated by high pressure gas generated by an inflator which, in addition to inflating the bag, pushes the bag and opens a lid mounted on an upper surface of the instrument panel. Thus, the air bag is developed and inflated into the compartment along a rear surface of a front windshield.

When a bar code indicated on the air bag module is read by a bar code reader, or the air bag module is attached to or removed from the instrument panel during maintenance, or the like, it is necessary to remove a glove box mounted at a lower portion of a side surface of the instrument panel adjacent the compartment so as to provide an opening sufficient to insert the bar code reader, or an impact wrench, through such opening.

However, if an operator attempts to access the air bag module through the opening for the glove box defined in the lower portion of the side of the instrument panel, he or she must bend his or her body and assume an uncomfortable attitude, resulting in a significantly inferior work position.

SUMMARY OF THE INVENTION

Accordingly, it is an object of the present invention to provide an instrument panel structure for a vehicle, wherein the maintenance, as well as the attaching and removing of an air bag module mounted within an instrument panel, can be easily carried out.

To achieve the above object, according to the present invention, there is provided an instrument panel structure for a vehicle, comprising an air bag module accommodated within an instrument panel mounted at a front end of a compartment, and an air bag which is to be inflated and developed from the air bag module through an upper surface of the instrument panel into the compartment, wherein the instrument panel is formed with an opening at an upper portion of its side surface at a side of the compartment so as to be opposed to the air bag module, and a removable goods accommodating means mounted in the opening.

With such construction, the air bag module can be exposed from the opening by removing the goods accommodating means, whereby the maintenance operation, as well as the attaching and removing operation of the air bag module, can be carried out. At this time, the operator need not bend his or her body to a lower portion of the instrument panel and can work in a comfortable attitude, because the opening is defined in the upper portion of the side of the instrument panel adjacent the air bag compartment.

The above and other objects, features and advantages of the invention will become apparent from the following description of preferred embodiments taken in conjunction with the accompanying drawings.

BRIEF DESCRIPTION OF THE DRAWINGS

FIG. 7 is an enlarged view of an encircled portion 7 in FIG. 6; and

FIG. 8 is an enlarged view of an encircled portion 8 in FIG. 6.

DESCRIPTION OF THE PREFERRED EMBODIMENTS

Figure 1:
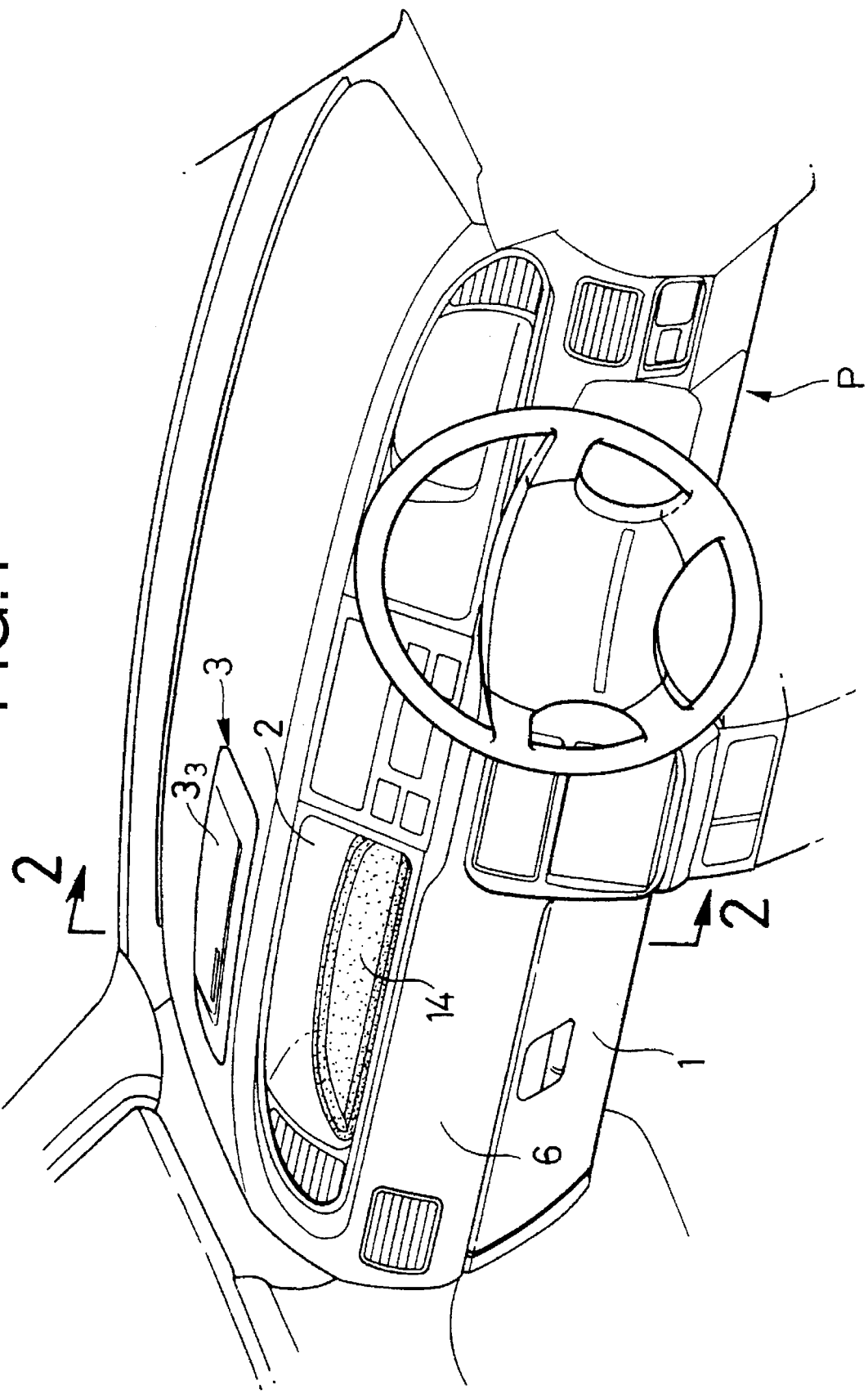
FIG. 1 is a perspective view of an instrument panel according to a first embodiment of the present invention.

FIGS. 1 to 4 illustrate a first embodiment of the present invention. Referring first to FIG. 1, an instrument panel P is mounted at a front end of a compartment in a vehicle. A glove box 1 is provided in a lower portion of the side of the instrument panel which is opposed to a passenger's seat, and a tray 2, serving as a goods accommodating means of the present invention, is provided above the glove box 1. A lid 3 is mounted on an upper surface of the instrument panel P for releasing and developing an air bag from an air bag module M accommodated in the instrument panel P.

Figure 2:
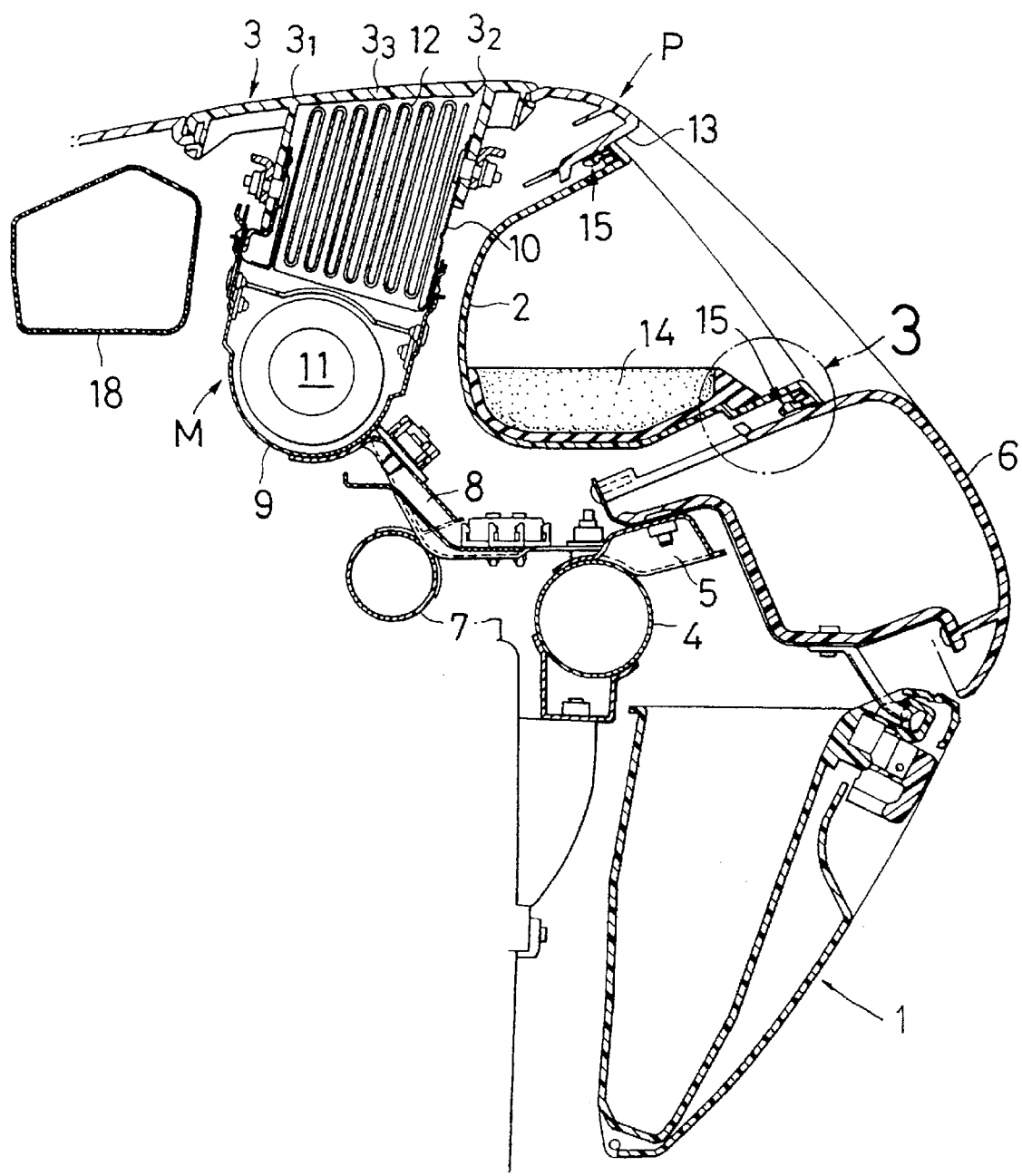
FIG. 2 is an enlarged sectional view taken along a line 2—2 in FIG. 1.

Referring to FIG. 2, a pad portion 6 of the instrument panel P is supported on a mounting bracket 5 which is mounted on a frame pipe 4 extending in a lateral direction of a vehicle body. The air bag module M is supported through a bracket 8 on a frame pipe 7 which is disposed in parallel to and in front of the frame pipe 4 toward the front of the vehicle.

The air bag module M includes an inflator accommodating vessel 9 coupled to the bracket 8, an air bag accommodating vessel 10 coupled to an upper portion of the inflator accommodating vessel 9, and the lid 3 coupled to the air bag accommodating vessel 10, such as, to cover an opening at an upper surface of the air bag accommodating vessel 10.

An inflator 11 is accommodated within the inflator accommodating vessel 9 and includes a cylindrical container filled with a propellant, so that the propellant is burnt to generate a high pressure nitrogen gas by firing a squib in response to a signal from an acceleration sensor, not shown. An air bag is accommodated in a folded state within the air bag accommodating vessel 10 and is inflated by the high pressure gas generated by the inflator 11. The lid 3, includes a lid body $3_3$, surrounded by a hinge portion $3_1$ and a fracture portion $3_2$. When a pressure sufficient to inflate the air bag 12 is applied, the fracture portion $3_2$ is broken to pivot and open the lid body $3_3$ about the hinge portion $3_1$, and the air bag 12 is developed into the passenger compartment through an opening defined as a result of opening of the lid body $3_3$.

An opening 13 is defined in an opposed relation to the air bag module M in an upper portion of the side of the instrument panel P adjacent the passenger compartment, i.e., above the pad portion 6. The tray 2 for accommodation of small goods is removably mounted in the opening 13. A tray mat 14 is laid on a bottom surface of the tray 2. The tray 2 is locked at a plurality of points around an outer periphery thereof in the opening 13 in the instrument panel P by locking means 15.

Figure 3:
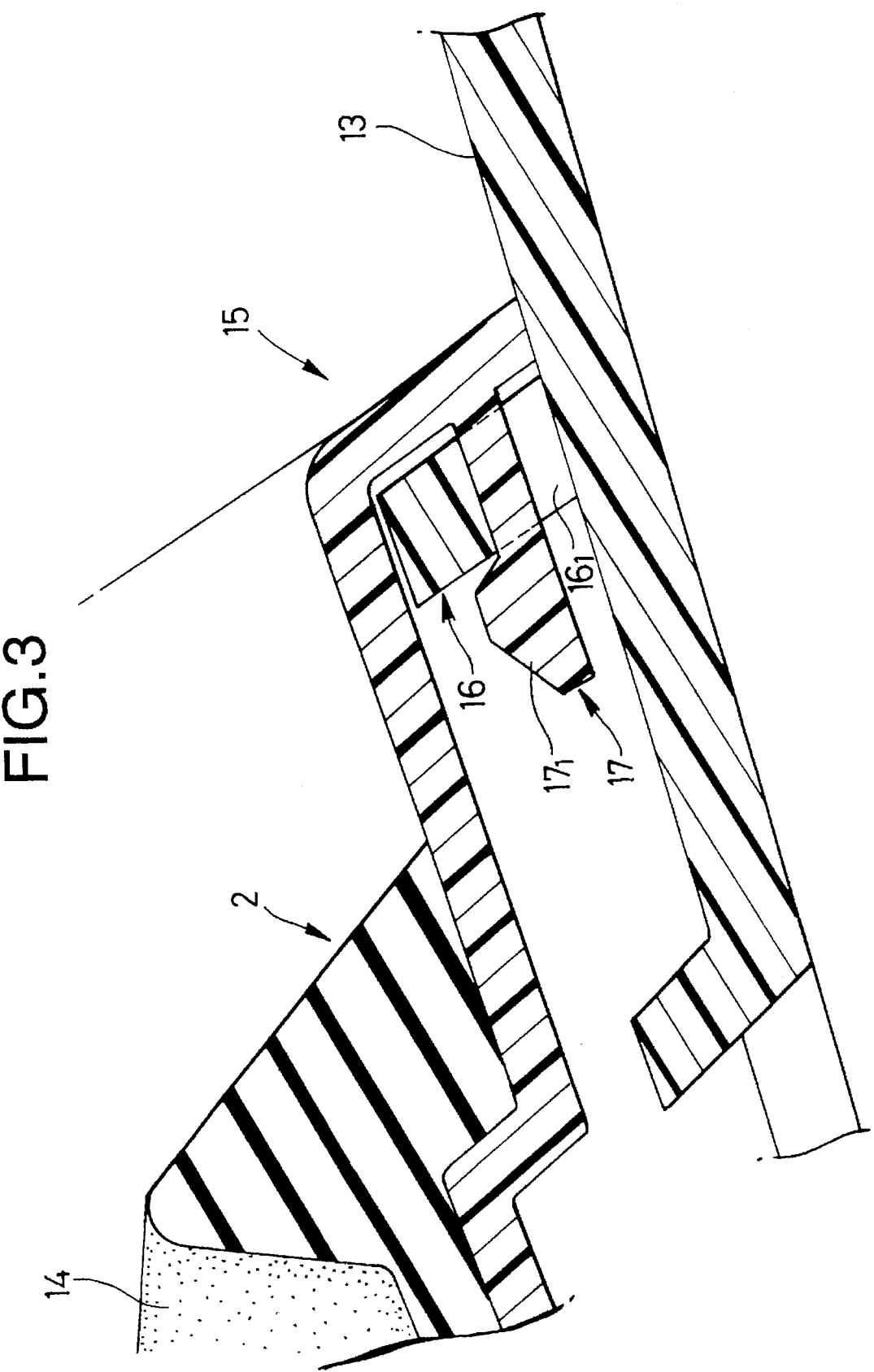
FIG. 3 is an enlarged view of an encircled portion 3 in FIG. 2.

As shown in FIG. 3, the locking means 15 includes a bracket 16 which is projected on the outer periphery of the opening 13 and a locking hole $16_1$ is defined in the bracket 16. The tray 2 includes a locking claw 17 which is projectingly provided on its outer periphery and has a wedge-shaped locking projection $17_1$ formed at a tip end of the locking claw 17. Thus, when the locking claw 17 of each of the locking means 15 is inserted into the locking hole $16_1$, the locking projection $17_1$ is brought into engagement with a back surface of the locking hole $16_1$ to retain the tray 2 in the opening 13. When the tray 2 is to be removed from the opening 13, an operator strongly pulls the tray 2 to elastically deform the locking claw, thereby disengaging the locking projection $17_1$ from the locking hole $16_1$.

Figure 4:
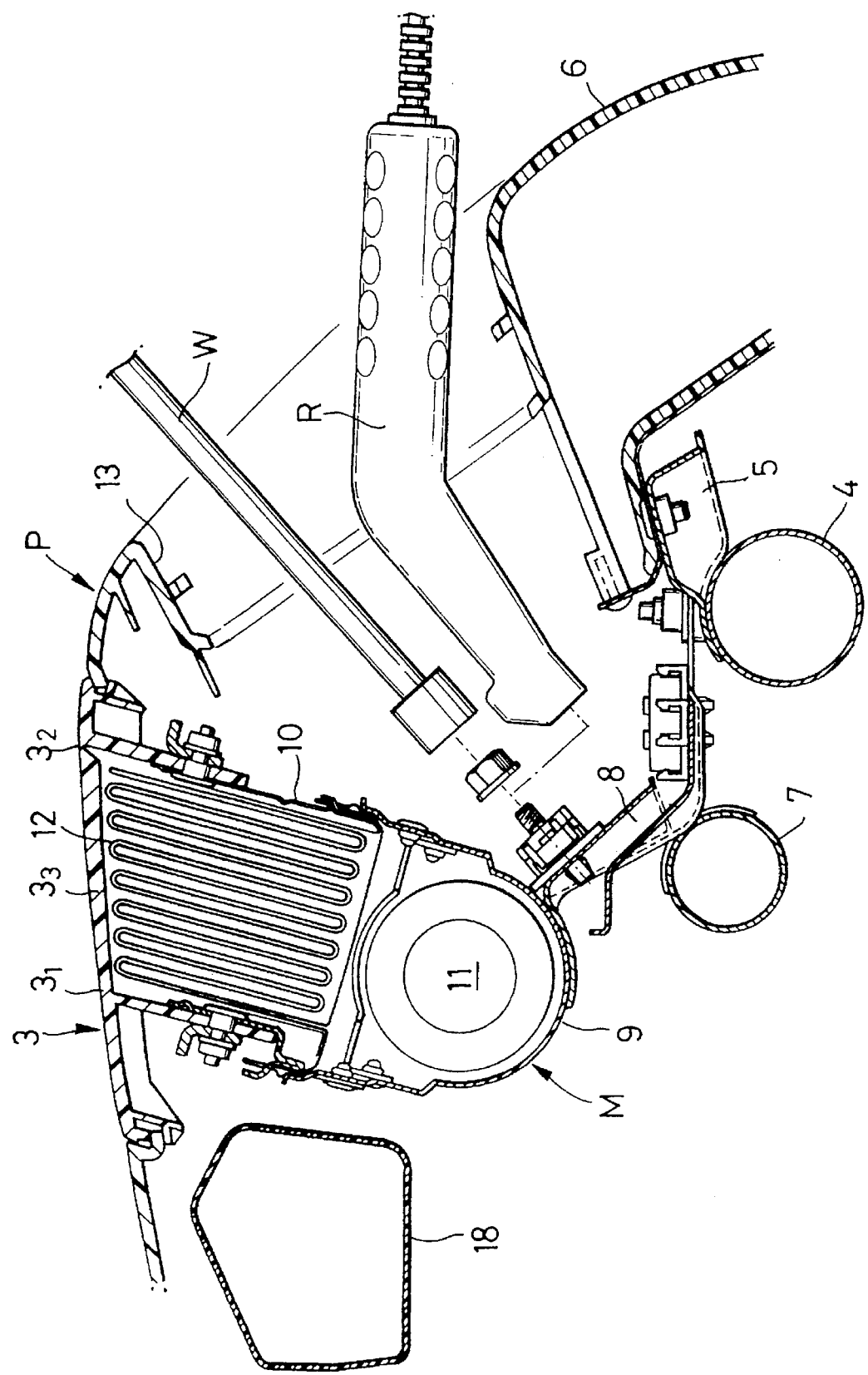
FIG. 4 is a view for explaining the operation.
Figure 5:
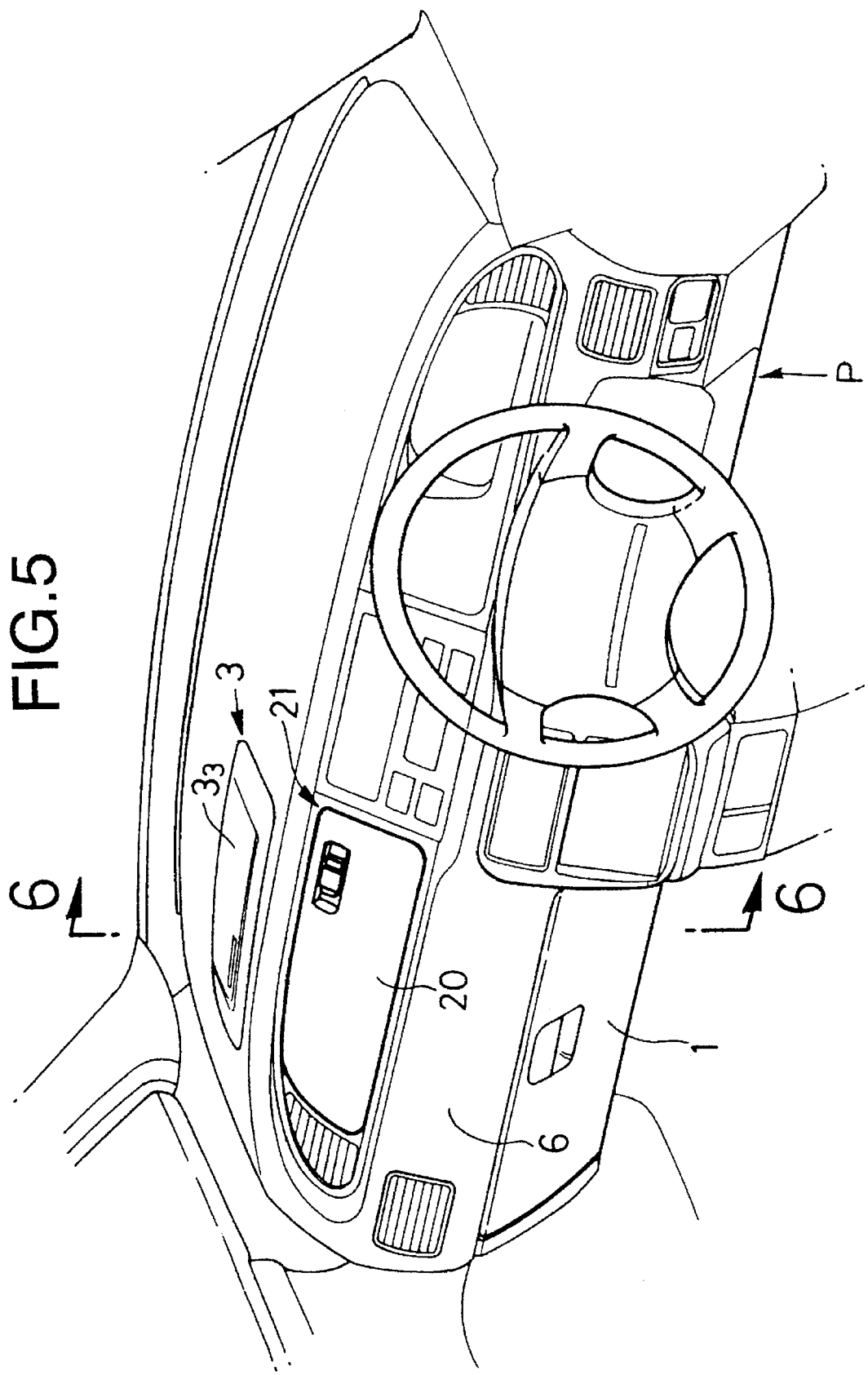
FIG. 5 is a perspective view of an instrument panel according to a second embodiment of the present invention.
Figure 6:
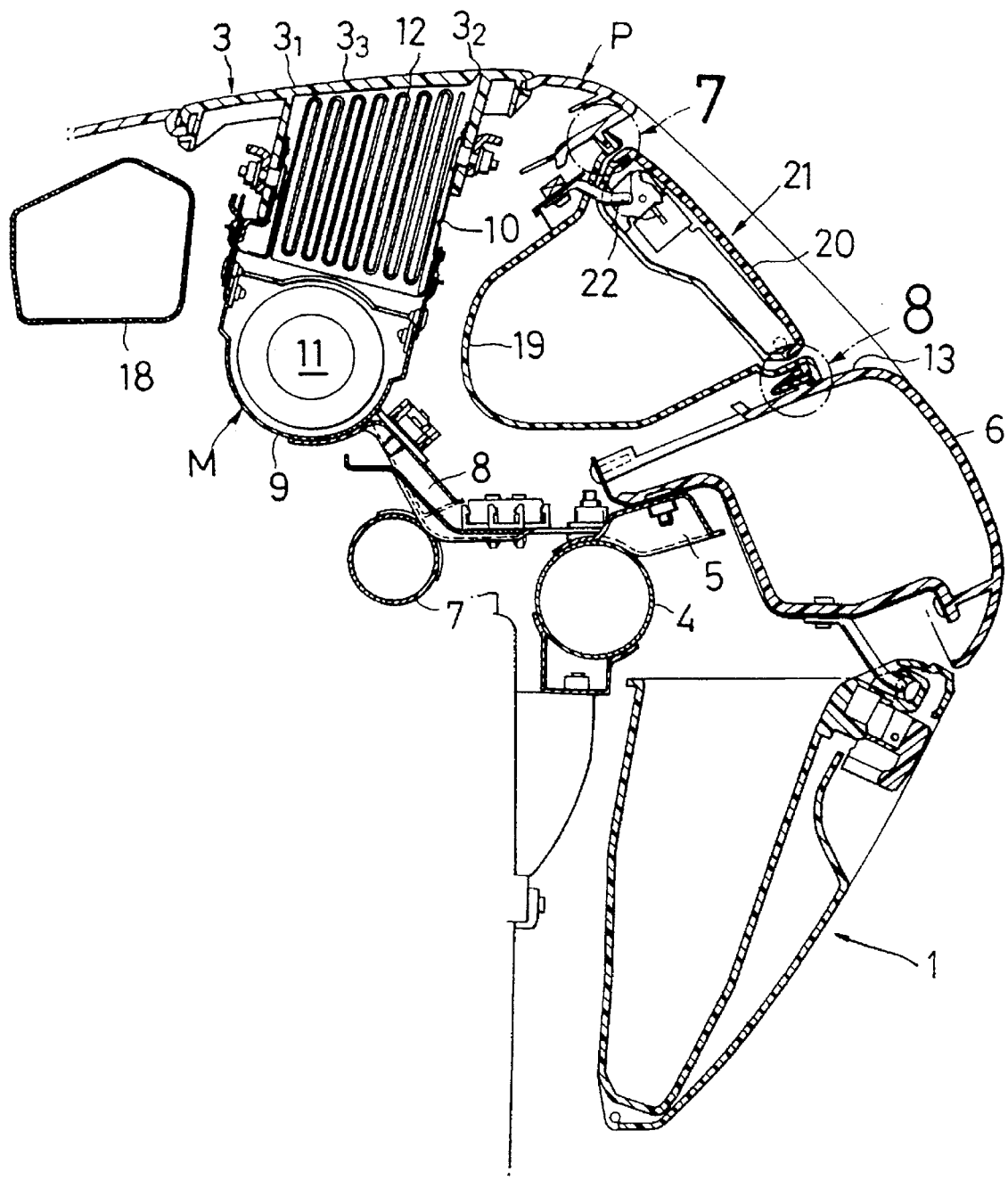
FIG. 6 is an enlarged sectional view taken along a line 6—6 in FIG. 5.

In order to dispose the tray 2 at a location in the rear of the air bag module M (at a side of a passenger seat), as described above, aduct 18, for an air conditioner, as shown in FIGS. 2 and 4 is disposed at a location in front of the air bag module M to avoid interference with tray 2.

Thus, when the vehicle encounters an acceleration equal to or greater than a predetermined value due to a collision of the vehicle, the propellant is burned by energization of the squib mounted to the inflator 11 of the air bag module M, so that the generated high pressure nitrogen gas flows into the folded air bag. When the air bag 12, supplied with the nitrogen gas, starts inflating within the air bag accommodating vessel 10, the fracture portion $3_2$ is broken by an inflation pressure, causing the lid body $3_3$ to be opened about the hinge portion $3_1$, so that the air bag 12 is developed along a front windshield into the passenger compartment to hold an occupant who is about to be moved forwardly by a collision inertia.

In carrying out the maintenance of the air bag module M, the tray 2, mounted in the upper portion of the side of the instrument panel P, is removed. Because the tray 2 is fitted and retained in the opening 13 in the instrument panel P by the plurality of locking means 15, as described above, the air bag module M, disposed in the opposed relation to the opening 13, is exposed to the compartment by removing the tray 2, as shown in FIG. 4. Thus, it is possible to insert a bar code reader R through the opening 13 to read a bar code, or to insert an impact wrench W to perform the tightening, or loosing operation of a bolt and a nut. During such operation, because the opening 13 is formed at the upper portion of the side surface of the instrument panel P, the operator can conduct the operation from a comfortable position without bending his or her body to the lower portion of the instrument panel P.

FIGS. 5 to 8 illustrate a second embodiment of the present invention. In the second embodiment, an accommodating box 21, serving as a goods accommodating means of the present invention, is provided at a location corresponding to the location of the tray 2 in the first embodiment. The accommodating box 21 includes a box body 19 and a lid 20 which is capable of opening and closing. The accommodating box 21 is detachably fitted and retained in an opening 13 defined in an upper portion of a side surface of an instrument panel P. The lid 20 is pivotally supported for opening and closing by a pivot 22 which is mounted at an upper portion of the box body 19.

As can be seen from FIG. 7, a locking means 23 for retaining the upper portion of the box body 19 in the opening 13 includes a locking groove 24 provided in an upper edge of the box body 19, and a locking projection 25 projected downwardly from an upper end of the opening 13 for engaging the locking groove 24.

As can be seen from FIG. 8, a locking means 26 for locking a lower portion of the box body 19 to the opening 13 includes a bracket 27 projectingly provided at a lower edge of the opening 13 and having a locking hole $27_1$, a support arm 28, projectingly provided at a lower edge of the box body 19, and a metal clip 29 secured to the support arm 28. The clip 29 includes a locking claw $29_1$ which is biased upwardly by its own elasticity to engage a back surface of the locking hole $27_1$.

Thus, the accommodating box 21 can be retained in the opening 13 by bringing the locking projection 25 of the upper locking means 23 into engagement with the locking groove 24 and then inserting the clip 29 of the lower locking means 26 into the locking hole $27_1$. To remove the accommodating box 21, a reverse procedure is carried out, i.e., the lower locking means 26 is first disengaged, and then, the upper locking means 23 is disengaged.

Also, in the second embodiment, it is possible to easily perform maintenance, as well as attaching and removing of the air bag module through the opening 13 by removing the accommodating box 21 from the opening 13 in the instrument panel P.

Although the embodiments of the present invention have been illustrated with respect to a right hand drive vehicle and described in detail, it will be understood that the present invention is not limited to the above-described embodiments, and various modifications including adaptation to a left hand drive vehicle may be made without departing from the spirit and scope of the invention defined in claims.

What is claimed is:

1. An instrument panel structure for enclosing an air bag module containing an inflatable air bag and for separating said air bag module from a passenger compartment of a vehicle, said structure comprising:

an instrument panel having an upper surface and a side surface suitably formed for mounting at a front portion of said passenger compartment with said side surface in confronting relation thereto, a first opening formed in the upper surface of said instrument panel operative to release said air bag, when inflated and developed, from said air bag module into said passenger compartment, a second opening formed at an upper portion of said instrument panel side surface, said second opening being disposed for alignment with said air bag module when installed in said vehicle, a goods accommodating means, and means for removably mounting said goods accommodating means in said second opening including resilient locking means on said goods accommodating means for engagement with cooperating means on said instrument panel.

2. An instrument panel structure for enclosing an air bag module containing an inflatable air bag and for separating said air bag module from a passenger compartment of a vehicle, said structure comprising:

an instrument panel having an upper surface and a side surface suitably formed for mounting at a front portion of said passenger compartment with said side surface in confronting relation thereto, a first opening formed in the upper surface of said instrument panel operative to release said air bag, when inflated and developed, from said air bag module into said passenger compartment, a second opening formed at an upper portion of said instrument panel side surface, said second opening being disposed for alignment with said air bag module when installed in said vehicle, an open tray forming a goods accommodating means, and means for removably mounting said open tray in said second opening.

* * * * *